(12) United States Patent
Yu

(10) Patent No.: US 9,151,975 B2
(45) Date of Patent: Oct. 6, 2015

(54) BACKLIGHT MODULE AND CONNECTING DEVICE THEREOF

(75) Inventor: Gang Yu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 966 days.

(21) Appl. No.: 13/377,530

(22) PCT Filed: Nov. 1, 2011

(86) PCT No.: PCT/CN2011/081604
§ 371 (c)(1),
(2), (4) Date: Dec. 9, 2011

(87) PCT Pub. No.: WO2013/060032
PCT Pub. Date: May 2, 2013

(65) Prior Publication Data
US 2013/0104353 A1    May 2, 2013

(30) Foreign Application Priority Data
Oct. 27, 2011 (CN) .......................... 2011 1 0331912

(51) Int. Cl.
*F16D 1/00* (2006.01)
*G02F 1/1333* (2006.01)

(52) U.S. Cl.
CPC ............... *G02F 1/133308* (2013.01); *G02F 2001/133325* (2013.01); *G02F 2201/465* (2013.01); *Y10T 24/45597* (2015.01); *Y10T 403/76* (2015.01)

(58) Field of Classification Search
CPC ............ Y10T 403/76; Y10T 24/45597; G02F 2001/465; G02F 2001/133325
USPC ......... 403/167, 168, 240, 252, 254, 261, 326, 403/329, 335, 336, 408.1; 24/614, 615, 24/616, 630; 362/632–634
See application file for complete search history.

(56) References Cited

U.S. PATENT DOCUMENTS

| | | | | |
|---|---|---|---|---|
| 3,476,165 A | * | 11/1969 | Vaughn | 411/103 |
| 5,568,946 A | * | 10/1996 | Jackowski | 285/38 |
| 5,671,513 A | * | 9/1997 | Kawahara et al. | 24/581.11 |
| 5,810,792 A | * | 9/1998 | Fangrow et al. | 604/533 |
| 5,897,142 A | * | 4/1999 | Kulevsky | 285/308 |
| 6,333,855 B2 | * | 12/2001 | Prabaonnaud et al. | 361/758 |

(Continued)

FOREIGN PATENT DOCUMENTS

CN    102149264 A    8/2011

*Primary Examiner* — Gregory Binda
*Assistant Examiner* — Nahid Amiri

(57) ABSTRACT

A connecting device comprises: a first connecting element, comprising a stopping portion and at least two elastic cantilevers disposed at two ends of the stopping portion, a via hole being formed in the stopping portion between the two elastic cantilevers, and a snap-fit portion being disposed on each of the elastic cantilevers; and a second connecting element comprising an abutting portion and a push-pull portion perpendicularly connected with the abutting portion, positioning rings being disposed at both ends of the abutting portion respectively. The push-pull portion of the second connecting element is inserted through the via hole of the first connecting element, and the elastic cantilevers are inserted into the positioning rings respectively. Thus, assembly and detachment of the first connecting element and the second connecting element can be easily achieved by applying a force to the push-pull portion.

10 Claims, 4 Drawing Sheets

(56) References Cited

U.S. PATENT DOCUMENTS

| | | | |
|---|---|---|---|
| 6,423,053 B1* | 7/2002 | Lee | 604/533 |
| 7,082,650 B2* | 8/2006 | Awakura et al. | 24/458 |
| 7,264,364 B2* | 9/2007 | Chen et al. | 362/29 |
| 7,334,927 B2* | 2/2008 | Lai et al. | 362/558 |
| 7,382,423 B2* | 6/2008 | Chang et al. | 349/64 |
| 7,845,685 B2* | 12/2010 | Blivet et al. | 285/314 |
| 7,878,553 B2* | 2/2011 | Wicks et al. | 285/319 |
| 2004/0232696 A1* | 11/2004 | Andre | 285/319 |
| 2011/0194264 A1* | 8/2011 | Hsieh et al. | 361/759 |

* cited by examiner

BACKLIGHT MODULE AND CONNECTING DEVICE THEREOF

BACKGROUND

1. Technical Field

The present disclosure relates to the field of backlight modules, and more particularly, to a backlight module and a connecting device thereof.

2. Description of Related Art

A liquid crystal display (LCD) device generally comprises a backlight module, an LCD panel, a front frame and a plastic frame. The front frame cooperates with the plastic frame to fix the LCD panel, and the backlight module is fixed with the plastic frame to provide uniformly distributed light having an adequate brightness so that the LCD device can display an image normally. The backlight module comprises a light source, a light guide plate and a backplate. The light source and the light guide plate are both fixed to the backplate, and the backplate is fixed with the plastic frame so that the backlight module is fixed with the plastic frame.

In conventional designs of LCD devices, the backplate 1 and the plastic frame 2 are usually fixed together through screw connection or snap-fit connection. As shown in FIG. 1, the screw connection is achieved by forming via holes at corresponding assembling positions in the backplate 1 and the plastic frame 2 and inserting a screw 300 into the via holes to fix the backplate 1 and the plastic frame 2 together. As shown in FIG. 2, the snap-fit connection is achieved by forming a through-groove 400 in the plastic frame 2 and a protrusion 500 on the backplate 1 at a position where the backplate 1 is to be assembled with the plastic frame 2, and then snap-fitting the protrusion 500 into the through-groove 400 to fix the backplate 1 with the plastic frame 2. Although both the two ways can fix the backplate 1 and the plastic frame 2 together, the screw connection requires use of a tool for installation and detachment, which is inconvenient; and the snap-fit connection also requires use of a tool for detachment and tends to cause deformation and damage of the parts.

BRIEF SUMMARY

The primary objective of the present disclosure is to provide a connecting device which is simple in structure and allows for easy assembly and detachment.

To achieve the aforesaid objective, the present disclosure provides a connecting device, which comprises:

a first connecting element, comprising a stopping portion and at least two elastic cantilevers disposed at two ends of the stopping portion, a via hole is formed in the stopping portion between the two elastic cantilevers, and a snap-fit portion is disposed on each of the elastic cantilevers; and a second connecting element, comprising an abutting portion and a push-pull portion perpendicularly connected with the abutting portion, positioning rings are disposed at both ends of the abutting portion respectively;

the push-pull portion of the second connecting element is inserted through the via hole of the first connecting element, and the elastic cantilevers are inserted into the positioning rings respectively.

Preferably, each of the elastic cantilevers comprises a fixed end and a free end, the fixed end connects with the stopping portion, and a distance between the fixed ends of the two elastic cantilevers is smaller than a distance between the free ends of the two elastic cantilevers.

Preferably, the snap-fit portion of each of the elastic cantilevers is a catch protruding from the free end of the elastic cantilever.

Preferably, each of the positioning rings is formed with an opening at a side thereof, and the elastic cantilever is snap-fitted into the positioning ring through the opening correspondingly.

Preferably, the snap-fit portion of each of the elastic cantilevers is a snap-fit groove formed at the free end of the elastic cantilever.

Preferably, the first connecting element and the second connecting element are both made of plastic.

The present disclosure further provides a backlight module, which comprises a first component, a second component and a connecting device for connecting the first component with the second component, the first component being formed with a first through-hole, the second component being formed with a second through-hole, and the connecting device comprising:

a first connecting element, comprising a stopping portion and at least two elastic cantilevers disposed at two ends of the stopping portion, a via hole is formed in the stopping portion between the two elastic cantilevers, and a snap-fit portion is disposed on each of the elastic cantilevers; and a second connecting element, comprising an abutting portion and a push-pull portion perpendicularly connected with the abutting portion, positioning rings are disposed at both ends of the abutting portion respectively;

the push-pull portion of the second connecting element is inserted through the via hole of the first connecting element, the elastic cantilevers are inserted into the positioning rings respectively, and the first connecting element and the second connecting element assembled together are inserted through the first through-hole and the second through-hole with the first component abutting against the stopping portion and the second component being snap-fitted with the snap-fit portion.

Preferably, each of the elastic cantilevers comprises a fixed end and a free end, the fixed end connects with the stopping portion, and a distance between the fixed ends of the two elastic cantilevers is smaller than a distance between the free ends of the two elastic cantilevers.

Preferably, the snap-fit portion of each of the elastic cantilevers is a catch protruding from the free end of the elastic cantilever, and the catch is snap-fitted to the second component.

Preferably, each of the positioning rings is formed with an opening at a side thereof, and the elastic cantilever is snap-fitted into the positioning ring through the opening correspondingly.

Preferably, the snap-fit portion of each of the elastic cantilever is a snap-fit groove formed at the free end of the elastic cantilever, and the second component is snap-fitted to the snap-fit groove.

Preferably, the first connecting element and the second connecting element are both made of plastic.

The present disclosure further provides a backlight module, which comprises a first component, a second component and a connecting device for connecting the first component with the second component, the first component being formed with a first through-hole, the second component being formed with a second through-hole, the connecting device being made of a plastic, and the connecting device comprising:

a first connecting element, comprising a stopping portion and at least two elastic cantilevers disposed at two ends of the stopping portion, a via hole is formed in the stopping portion between the two elastic cantilevers, each of the elastic cantilevers comprises a snap-fit portion, a fixed end and a free end, the fixed end connects with the stopping portion, and a distance between the fixed ends of the two elastic cantilevers is smaller than a distance between the free ends of the two elastic cantilevers; and a second connecting element, comprising an abutting portion and a push-pull portion perpendicularly connected with the abutting portion, positioning rings are disposed at both ends of the abutting portion respectively;

the push-pull portion of the second connecting element is inserted through the via hole of the first connecting element, the elastic cantilevers are inserted into the positioning rings respectively, and the first connecting element and the second connecting element assembled together are inserted through the first through-hole and the second through-hole with the first component abutting against the stopping portion and the second component being snap-fitted with the snap-fit portion.

Preferably, the snap-fit portion of each of the elastic cantilevers is a catch protruding from the free end of the elastic cantilever, and the catch is snap-fitted to the second component.

Preferably, each of the positioning rings is formed with an opening at a side thereof, and the elastic cantilever is snap-fitted into the positioning ring through the opening correspondingly.

Preferably, the snap-fit portion of each of the elastic cantilever is a snap-fit groove formed at the free end of the elastic cantilever, and the second component is snap-fitted to the snap-fit groove.

According to the present disclosure, the elastic cantilevers are inserted through the positioning rings to apply a force against the push-pull portion so that one fixed element is fixed by the abutting portion and the stopping portion and the other fixed element is fixed by the snap-fit portions of the elastic cantilevers; and during the detachment process, a force is applied to the push-pull portion to disengage the elastic cantilevers from the positioning rings. Therefore, the connecting device of the present disclosure is not only simple in structure but also allows for easy assembly and detachment of components of the module simply by applying a force to the push-pull portion.

Hereinafter, implementations, functional features and advantages of the present disclosure will be further described with reference to embodiments thereof and the attached drawings.

DETAILED DESCRIPTION

Hereinbelow, the present disclosure will be further described with reference to the attached drawings and embodiments thereof. It shall be understood that, the embodiments described herein are only intended to illustrate but not to limit the present disclosure.

Figure 1:
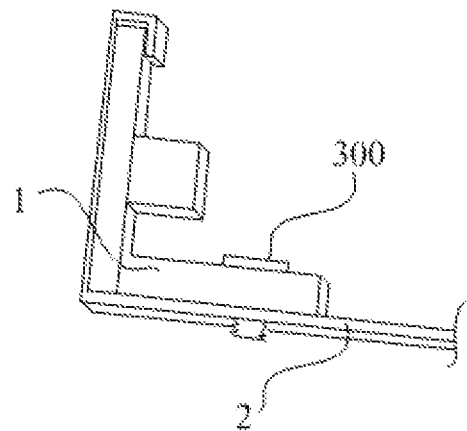
FIG. 1 is a schematic structural view of a conventional backlight module assembled by a screw.
Figure 2:
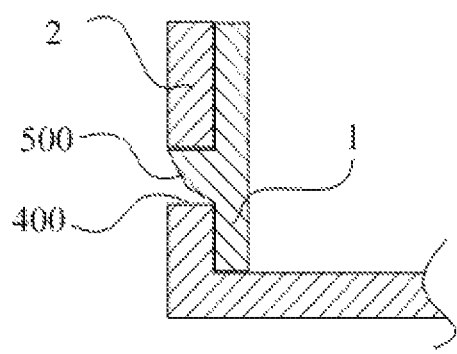
FIG. 2 is a schematic structural view of a conventional backlight module assembled by means of snap-fitting.
Figure 3:
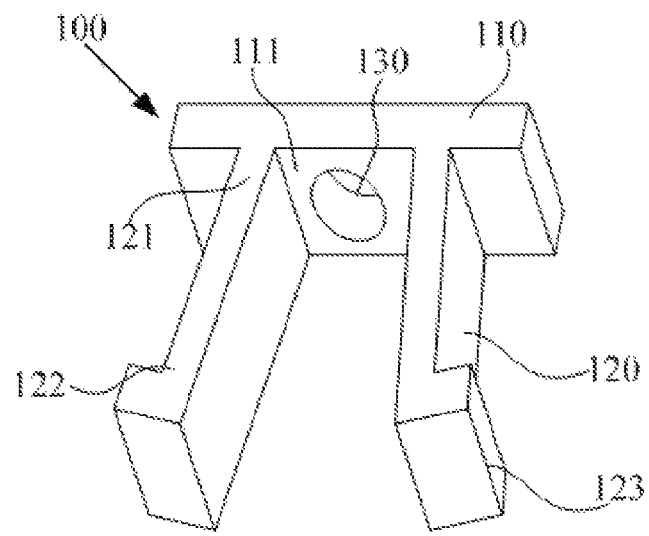
FIG. 3 is a schematic structural view of an embodiment of a first connecting element of a connecting device of the present disclosure.
Figure 4:
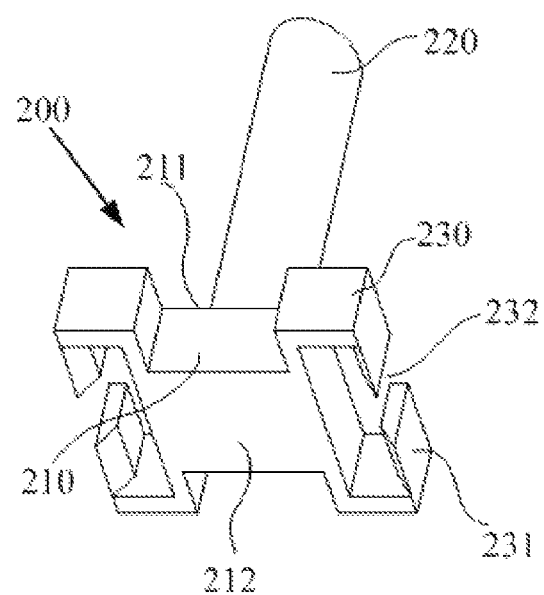
FIG. 4 is a schematic structural view of a second connecting element of the connecting device of the present disclosure.
Figure 6:
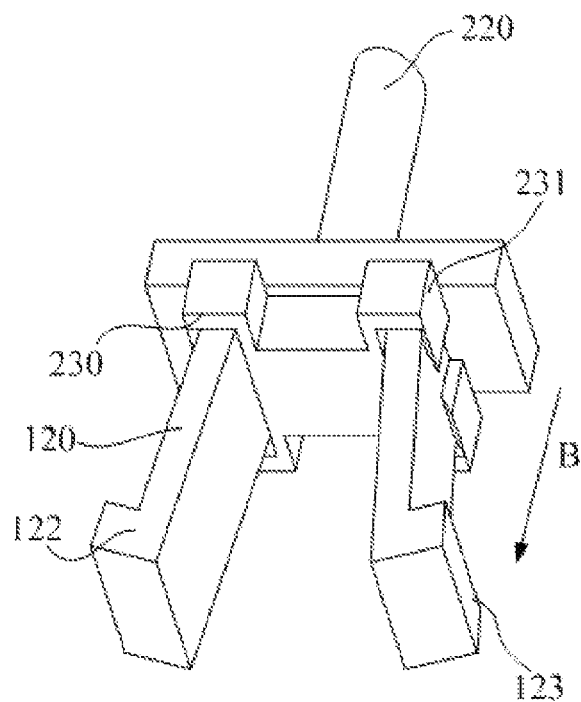
FIG. 6 is a schematic view illustrating a state after the first connecting element shown in FIG. 3 is assembled with the second connecting element shown in FIG. 4.

Referring to FIG. 3 and FIG. 4, FIG. 3 is a schematic structural view of an embodiment of a first connecting element of a connecting device of the present disclosure, and FIG. 4 is a schematic structural view of a second connecting element of the connecting device of the present disclosure. The connecting device of the present disclosure comprises a first connecting element 100 and a second connecting element 200, both of which are made of a plastic. The first connecting element 100 comprises a stopping portion 110 and at least two elastic cantilevers 120 connected with the stopping portion 110 and extending along the linear direction of an arrow B (as shown in FIG. 6). A via hole 130 is formed in the stopping portion 110 between the two elastic cantilevers 120, and a snap-fit portion is disposed on each of the elastic cantilevers 120. In this embodiment, the snap-fit portion is a catch 123 protruding from a free end of the elastic cantilever 120.

Figure 5:
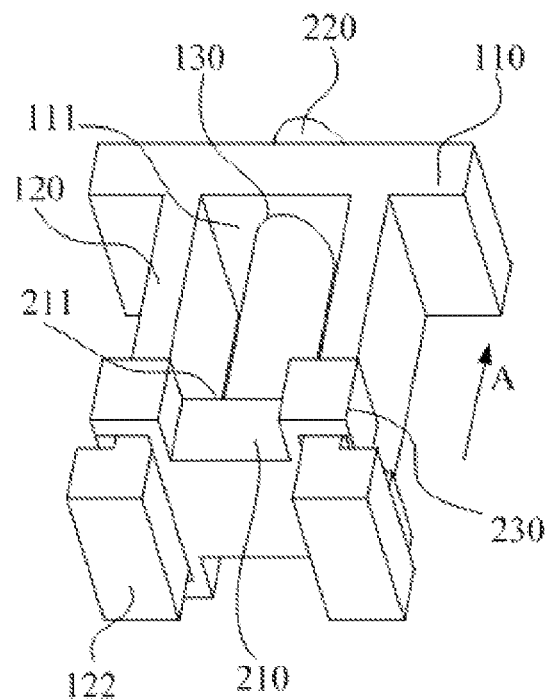
FIG. 5 is a schematic view illustrating how the first connecting element shown in FIG. 3 is assembled with the second connecting element shown in FIG. 4.

The second connecting element 200 comprises an abutting portion 210 and a push-pull portion 220 which extends perpendicularly to the abutting portion 210, along the linear direction of an arrow A (as shown in FIG. 5, opposite to the linear direction of the arrow B), and can pass through the via hole 130. A positioning ring 230 for one of the elastic cantilevers 120 to pass therethrough is disposed at each of both ends of the abutting portion 210.

When the first connecting element 100 is assembled with the second connecting element 200, the elastic cantilevers 120 are snap-fitted into the positioning rings 230 respectively, the push-pull portion 220 is inserted through the via hole 130, and then a force is applied to the abutting portion 210 so that the abutting portion 210 abuts against the stopping portion 110.

In detail, the stopping portion 110 comprises an abutting surface 111, and each of the elastic cantilevers 120 comprises a fixed end 121 disposed on the abutting surface 111 and a free end 122 protruding from the abutting surface 111. A distance between the fixed ends 121 of the two elastic cantilevers 120 is smaller than a distance between the free ends 122 of the two elastic cantilevers 120.

The abutting portion 210 is of an I-shape and comprises a first side surface 211 and a second side surface 212. Each of the positioning rings 230 extends through the first side surface 211 and the second side surface 212 of the abutting portion 210, and comprises sidewalls 231 which extend outwards from two sides of the abutting portion 210 respectively and are then bent towards each other. Free ends of the two sidewalls 231 are opposite to each other and spaced apart at a distance to form an opening 232.

Referring to FIG. 5 and FIG. 6, FIG. 5 is a schematic view illustrating how the first connecting element 100 is assembled with the second connecting element 200, and FIG. 6 is a schematic view illustrating a state after the first connecting element 100 is assembled with the second connecting element 200. The push-pull portion 220 is inserted through the via hole 130 between the elastic cantilevers 120 and the free ends 122 of the elastic cantilevers 120 are squeezed inward to cause deformation of the opening 232 so that the elastic cantilevers 120 are inserted into the positioning rings 230 respectively. By pushing forward the abutting portion 210 or pulling the push-pull portion 220, the second connecting element 200 can move closer relative to the first connecting element 100 in the linear direction of the arrow A shown in FIG. 5 until the abutting portion 210 abuts against the stopping portion 110; that is, the first side surface 211 of the abutting portion 210 abuts against the abutting surface 111 of the stopping portion 110. When the positioning rings 230 have moved to the fixed ends 121 of the two elastic cantilevers 120, the distance between the fixed ends 121 of the two elastic cantilevers 120 is smaller than the distance between the free ends 122 of the two elastic cantilevers 120, and elasticity of the elastic cantilevers 120 is restored.

Referring to FIG. 6, during the process of detaching the first connecting element 100 and the second connecting element 200, the free ends 122 of the two elastic cantilevers 120 are squeezed to move inward towards each other; and a thrust is applied to the push-pull portion 220 so that the positioning rings 230 move to the free ends of the two elastic cantilevers 120 in the linear direction of the arrow B along the two elastic cantilevers 120 respectively, thereby the second connecting element moves apart relative to the first connecting element in the first linear direction. Then, by disengaging the elastic cantilevers 120 from the positioning rings 230 as shown in FIG. 5, the detachment of the first connecting element 100 and the second connecting element 200 is completed.

The cross-sectional shape of each of the positioning rings 230 matches with the cross-sectional shape of each of the elastic cantilevers 120. For example, if the cross-section of each of the elastic cantilevers 120 is of a quadrangular form, then the cross-section of each of the positioning rings 230 is also a quadrangular form; and if the cross-section of each of the elastic cantilevers 120 is of a circular form, then the cross-section of each of the positioning rings 230 is also a circular form. Furthermore, deformation of the openings 232 caused when the elastic cantilevers 120 pass through the positioning rings 230 allows the elastic cantilevers 120 to pass through the positioning rings 230 more smoothly.

Figure 7:
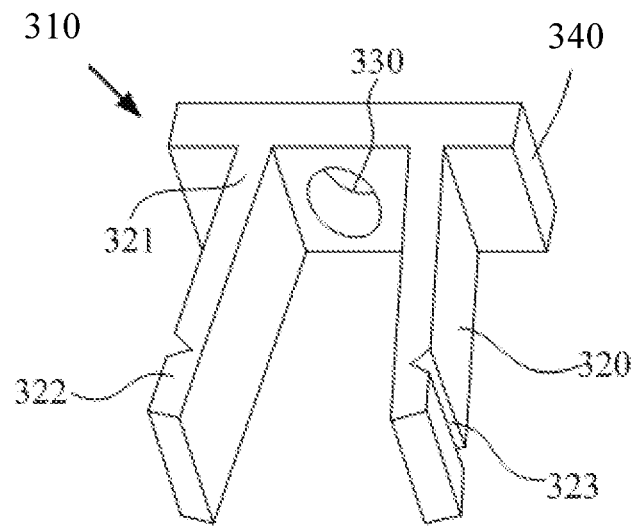
FIG. 7 is a schematic structural view of another embodiment of the first connecting element of the connecting device of the present disclosure.

Referring to FIG. 7, there is shown a schematic structural view of another embodiment of the first connecting element of the connecting device of the present disclosure. The first connecting element 310 of this embodiment differs from that of the first embodiment in that: the snap-fit portions are snap-fit grooves 323 recessed inward at free ends 322 of elastic cantilevers 320. During the assembling process of the first connecting element 310 and the second connecting element 200, the push-pull portion 220 is inserted through a via hole 330 between the elastic cantilevers 320 and the elastic cantilevers 320 are inserted into the positioning rings 230 respectively. Then, by pushing forward the abutting portion 210 or pulling the push-pull portion 220, the second connecting element 200 can move relative to the first connecting element 310 until the abutting portion 210 abuts against stopping portion 340 of the first connecting element 310. When the positioning rings 230 move to fixed ends 321 of the elastic cantilevers 320, elasticity of the elastic cantilevers 320 is restored. As the snap-fit portion in this embodiment is the snap-fit groove 323 recessed at the free end 322 of each of the elastic cantilevers 320, the elastic cantilevers 320 can be inserted into the positioning rings 230 respectively without being squeezed. This makes it unnecessary to form the opening 232 in each of the positioning rings 230 of the second connecting element 200 that is to be assembled with the first connecting element 310 of this embodiment.

Figure 8:
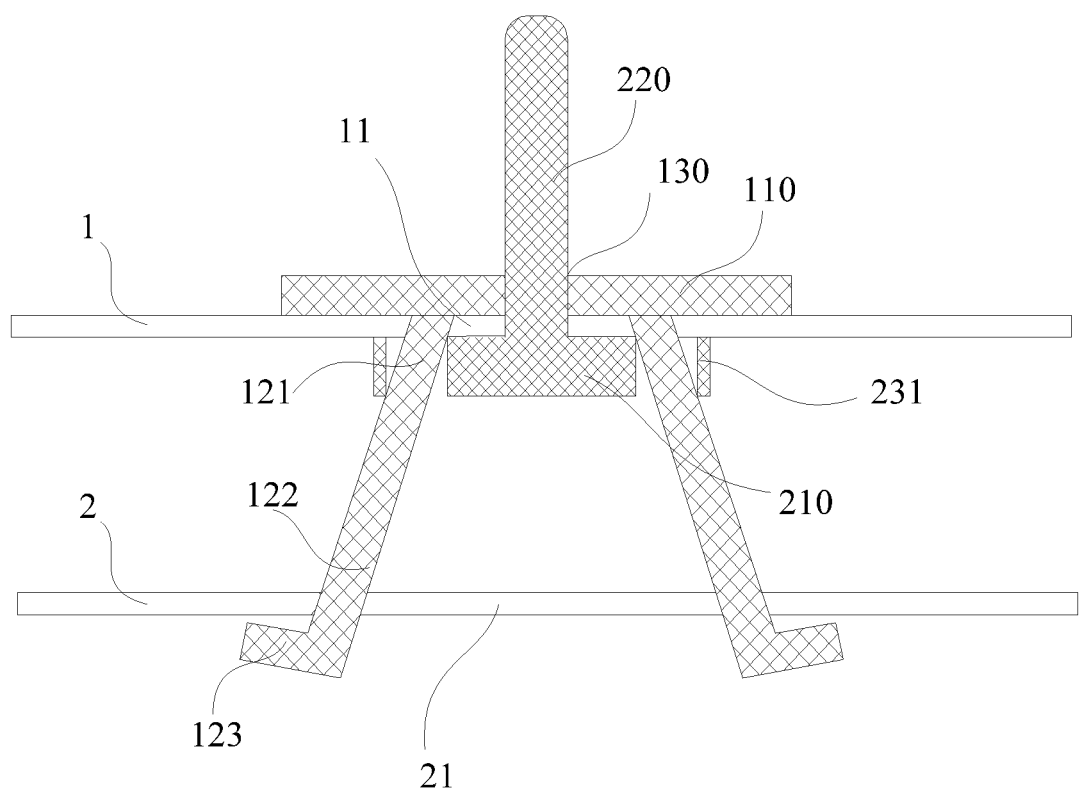
FIG. 8 is a schematic cross-sectional structural view of a backlight module after being assembled according to the present disclosure.

Referring to FIG. 8, there is shown a schematic cross-sectional structural view of a backlight module after being assembled according to the present disclosure. The backlight module comprises a first component 1, a second component 2 and a connecting device for connecting the first component 1 with the second component 2. The first component 1 is formed with a first through-hole 11, and the second component 2 is formed with a second through-hole 21 at a corresponding position. Referring to FIG. 3 and FIG. 4, the connecting device comprises a first connecting element 100 and a second connecting element 200. Detailed structures and processes of assembling and detaching the first connecting element 100 and the second connecting element 200 are just the same as what described above, so these will not be further described herein. The first connecting element 100 and the second connecting element 200 assembled together as shown in FIG. 5 are inserted through the first through-hole 11 and the second through-hole 21 with the stopping portion 110 of the first connecting element 100 abutting against the first component 1. The stopping portion 110 is not limited to a rectangular form, and any form of the stopping portion 110 that can abut against the first component 1 shall fall within the scope of the present disclosure. By pulling the push-pull portion 220 or pushing forward the abutting portion 210, the abutting portion 210 is moved closer to the stopping portion 110 until the abutting portion 210 abuts against the first component 1 to hold the first component 1 between the stopping portion 110 and the abutting portion 210. At this time, the elastic cantilevers 120 also recover from deformation and the snap-fit portions thereof snap-fit the second component 2. In this embodiment, a catch 123 is snap-fitted into the second component 2. However, in other embodiments, it may also be possible that a snap-fit groove 323 is snap-fitted into the second component 2 as shown in FIG. 7. During the detachment process, by pushing forward the push-pull portion 220, sidewalls 231 of positioning rings squeeze the free ends 122 of the two elastic cantilevers 120 to move inward towards each other so that snap-fit portions are disengaged from the second component 2. Thereby, the first connecting element 100 and the second connecting element 200 assume the state shown in FIG. 5. Then, the first connecting element 100 and the second connecting element 200 are taken out of the first through-hole 11 and the second through-hole 21 to complete the detachment of the first component 1 and the second component 2.

According to the embodiments of the present disclosure, by use of the first connecting element 100 and the second connecting element 200 with simple structures and by applying a force to the push-pull portion 220, assembly and detachment of the first component 1 and the second component 2 of the backlight module can be easily completed. Therefore, the connecting device of the present disclosure is not only simple in structure but also allows for easy assembly and detachment without damage to the first component 1 and the second component 2 during the detachment process.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A backlight module, comprising a first component, a second component and a connecting device for connecting the first component with the second component, the first component being formed with a first through-hole, the second component being formed with a second through-hole, and the connecting device comprising:

a first connecting element, comprising a stopping portion and at least two elastic cantilevers disposed at two ends of the stopping portion, a via hole being formed in the stopping portion between the two elastic cantilevers, and a snap-fit portion is disposed on each of the elastic cantilevers; and a second connecting element, comprising an abutting portion and a push-pull portion perpendicularly connected with the abutting portion, positioning rings being disposed at both ends of the abutting portion respectively;

the push-pull portion of the second connecting element being inserted through the via hole of the first connecting element, the elastic cantilevers being inserted into the positioning rings respectively, and the first connecting element and the second connecting element assembled together being inserted through the first through-hole and the second through-hole with the first component abutting against the stopping portion and the second component being snap-fitted with the snap-fit portion;

wherein the at least two elastic cantilevers extend along a first linear direction, the push-pull portion extends along a second linear direction opposite to the first linear direction, when the second connecting element is assembled with the first connecting element, pulling of the push-pull portion allows the second connecting element to move closer relative to the first connecting element in the second linear direction;

during the process of detaching the first connecting element from the second connecting element, the push-pull portion is pushed, thereby the second connecting element moves apart relative to the first connecting element in the first linear direction.

2. The backlight module of claim 1, wherein each of the elastic cantilevers comprises a fixed end and a free end, the fixed end connects with the stopping portion, and a distance between the fixed ends of the two elastic cantilevers is smaller than a distance between the free ends of the two elastic cantilevers.

3. The backlight module of claim 1, wherein the snap-fit portion of each of the elastic cantilevers is a catch protruding from the free end of the elastic cantilever, and the catch is snap-fitted to the second component.

4. The backlight module of claim 3, wherein each of the positioning rings is formed with an opening at a side thereof, and the elastic cantilever is snap-fitted to the positioning ring through the opening correspondingly.

5. The backlight module of claim 1, wherein the snap-fit portion of each of the elastic cantilever is a snap-fit groove formed at the free end of the elastic cantilever, and the second component is snap-fitted to the snap-fit groove.

6. The backlight module of claim 1, wherein the first connecting element and the second connecting element are both made of plastic.

7. A backlight module, comprising a first component, a second component and a connecting device for connecting the first component with the second component, the first component being formed with a first through-hole, the second component being formed with a second through-hole, the connecting device being made of plastic, and the connecting device comprising:

a first connecting element, comprising a stopping portion and at least two elastic cantilevers disposed at two ends of the stopping portion, a via hole being formed in the stopping portion between the two elastic cantilevers, each of the elastic cantilevers comprising a snap-fit portion, a fixed end connected with the stopping portion and a free end, and a distance between the fixed ends of the two elastic cantilevers being smaller than a distance between the free ends of the two elastic cantilevers; and a second connecting element, comprising an abutting portion and a push-pull portion perpendicularly connected with the abutting portion, positioning rings being disposed at both ends of the abutting portion respectively;

the push-pull portion of the second connecting element being inserted through the via hole of the first connecting element, the elastic cantilevers being inserted into the positioning rings respectively, and the first connecting element and the second connecting element assembled together being inserted through the first through-hole and the second through-hole with the first component abutting against the stopping portion and the second component being snap-fitted with the snap-fit portion;

wherein the at least two elastic cantilevers extend along a first linear direction, the push-pull portion extends along a second linear direction opposite to the first linear direction, when the second connecting element is assembled with the first connecting element, pulling of the push-pull portion allows the second connecting element to move closer relative to the first connecting element in the second linear direction;

during the process of detaching the first connecting element from the second connecting element, the push-pull portion is pushed, thereby the second connecting element moves apart relative to the first connecting element in the firs linear direction.

8. The backlight module of claim 7, wherein the snap-fit portion of each of the elastic cantilevers is a catch protruding from the free end of the elastic cantilever, and the catch is snap-fitted to the second component.

9. The backlight module of claim 8, wherein each of the positioning rings is formed with an opening at a side thereof, and the corresponding elastic cantilever is snap-fitted to the positioning ring through the opening.

10. The backlight module of claim 7, wherein the snap-fit portion of each of the elastic cantilever is a snap-fit groove formed at the free end of the elastic cantilever, and the second component is snap-fitted to the snap-fit groove.

* * * * *